US012401141B2

(12) United States Patent
Daoust et al.

(10) Patent No.: US 12,401,141 B2
(45) Date of Patent: Aug. 26, 2025

(54) METER BOX GROUND CLAMP CONFIGURED TO PREVENT THE CLAMP FROM MOVING OFF THE METER BOX IN RESPONSE TO A TIGHTENING TORQUE

(71) Applicant: PPC BROADBAND, INC., East Syracuse, NY (US)

(72) Inventors: Daniel Daoust, Syracuse, NY (US); Andriy Lozhko, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 240 days.

(21) Appl. No.: 18/092,736

(22) Filed: Jan. 3, 2023

(65) Prior Publication Data

US 2023/0216223 A1 Jul. 6, 2023

Related U.S. Application Data

(60) Provisional application No. 63/295,601, filed on Dec. 31, 2021.

(51) Int. Cl.

| | |
|---|---|
| ***H01R 11/26*** | (2006.01) |
| ***H01R 4/26*** | (2006.01) |
| ***H01R 4/30*** | (2006.01) |
| ***H01R 4/36*** | (2006.01) |
| ***H01R 4/38*** | (2006.01) |
| ***H01R 4/64*** | (2006.01) |
| ***H01R 11/05*** | (2006.01) |

(52) U.S. Cl.

CPC ............... *H01R 11/26* (2013.01); *H01R 4/26* (2013.01); *H01R 4/305* (2013.01); *H01R 4/36* (2013.01); *H01R 4/38* (2013.01); *H01R 4/64* (2013.01); *H01R 11/05* (2013.01)

(58) Field of Classification Search

CPC .......... H01R 11/26; H01R 4/26; H01R 4/305; H01R 4/36; H01R 4/38

USPC .................................... 439/431, 100, 95, 92

See application file for complete search history.

(56) References Cited

U.S. PATENT DOCUMENTS 5,006,074 A * 4/1991 Franks, Jr. ......... B23K 37/0435 439/433

5,928,006 A * 7/1999 Franks, Jr. ............... H01R 4/36 439/803

6,329,592 B1 * 12/2001 Auclair .................... H01R 4/32 439/98

(Continued)

*Primary Examiner* — Tulsidas C Patel

*Assistant Examiner* — Jeffrey Mountain

(74) *Attorney, Agent, or Firm* — MH2 TECHNOLOGY LAW GROUP LLP

(57) ABSTRACT

A meter box ground clamp may include a body portion having a first portion, a second portion, and a gripping portion, and a fastener member configured to couple the body portion to an electrical meter box. The fastener member may be configured to extend through the first portion to engage a first surface of the meter box and move the first portion away from the first surface and move the gripping portion into engagement with a second surface of the meter box that faces away from the first surface. The receiving portion may be configured to receive the fastener member so as to create a force that urges the second portion of the body portion toward the meter box in response to a tightening torque applied to the fastener member so as to prevent the body portion from moving off the meter box in response to the tightening torque.

20 Claims, 10 Drawing Sheets

(56) References Cited

U.S. PATENT DOCUMENTS

| | | | | |
|---|---|---|---|---|
| 6,857,881 | B1 * | 2/2005 | Balfour | H01R 4/40<br>439/803 |
| 6,935,869 | B1 * | 8/2005 | Auclair | H01R 4/38<br>439/803 |
| 2018/0231584 | A1 * | 8/2018 | Hanson | G01R 11/02 |

* cited by examiner

METER BOX GROUND CLAMP CONFIGURED TO PREVENT THE CLAMP FROM MOVING OFF THE METER BOX IN RESPONSE TO A TIGHTENING TORQUE

CROSS-REFERENCE TO RELATED APPLICATION

This application claims the benefit of U.S. Provisional Application No. 63/295,601, filed Dec. 31, 2021, the disclosure of which is hereby incorporated by reference herein in its entirety.

TECHNICAL FIELD

The present disclosure relates generally to devices for implementing a ground connection between an electrical meter box and a common ground point and, more particularly, to clamps that mount to an electrical meter box and connect with a common ground point.

BACKGROUND

Conventional devices for connecting a ground wire with an electrical meter typically include a clamp assembly that is clamped onto the exterior of the electrical meter box which is mounted on the wall of a building. Conventional clamp assemblies typically utilize a single hooking feature to engage the exterior of the meter box which does not provide the clamp assemblies with the flexibility to clamp to adapt to various mounting surfaces.

When attaching conventional clamping assemblies to a meter box, technicians often use an impact driver, which can exert upwards of 150 in-lbs of torque on the screw of the ground clamp. Such torque can cause the entire clamp to rotate and walk off or jump off or move off the meter box.

Conventional clamping assemblies are sometimes attached to a meter box that has been painted or otherwise includes a substance on its surface that prevents a clamping bolt from obtaining a strong ground connection with the meter box.

It may be desirable to provide a meter box ground clamp that does not walk off the meter box while being tightened. It may be desirable to provide a meter box ground clamp having separate hooking features to allow flexibility when attaching the clamp to a surface. It may be desirable to provide a screw configured to cut through paint on a surface of the meter box to improve the ground connection.

SUMMARY

According to various embodiments of the disclosure, a meter box ground clamp may include a clamp body, a clamp screw configured to couple the clamp body to an electrical meter box, and a ground engagement screw configured to couple a ground wire with the electrical meter box. The clamp body may comprise an L-shaped body that includes a first arm portion and a second arm portion that are configured as a monolithic structure of unitary construction, and the clamp screw may include a head portion and a threaded portion extending from the head portion. The first arm portion may include a first threaded opening configured to threadedly receive the threaded portion of the clamp screw, the head portion of the clamp screw may include an opening configured to extend through the head portion and to receive the ground wire therethrough, a top surface of the head portion may include a second threaded opening configured to extend into the opening and to threadedly receive the ground engagement screw, and the ground engagement screw may be configured to be threaded into the opening to engage the ground wire and mechanically and electrically couple the ground wire to the clamp body. The clamp body may include a gripping claw configured to extend from the second arm portion and curve toward the first arm portion, the gripping claw may be configured to engage a first surface of an electrical meter box, and the first arm portion may be configured to be positioned adjacent a second surface of the meter box. The clamp screw may be configured to be threaded into the first threaded opening to engage the second surface of the meter box that faces away from the first surface of the meter box so as to move the first arm portion away from the second surface of the meter box and move the gripping claw into engagement with the first surface of the meter box. The clamp screw may include a tip portion that extends from a radial center of the threaded portion at the free end and is configured to extend beyond the free end of the threaded portion such that the tip portion is configured to engage the second surface of the meter box before the threaded portion when the clamp body is being clamped to the meter box, and the tip portion may be configured to center the clamp screw at a desired location at the second surface of the meter box when the clamp screw is tightening the clamp body to the meter box. The threaded portion of the clamp screw may include a fluted portion at the free end that is configured to cut into the second surface of the meter box to strip paint from the second surface when the clamp screw is tightening the clamp body to the meter box so as to expose base metal of the meter box to facilitate a better grounding connection between the ground clamp and the meter box. The first threaded opening may be configured to receive the clamp screw at a first angle less than 90 degrees relative to a plane of the first arm portion such that a free end of the clamp screw forms a second angle greater than zero degrees relative to the second surface of the meter box, and the second angle may be configured to create a force that urges the second arm of the clamp body toward the meter box in response to a tightening torque applied to the clamp screw so as to prevent the clamp body from moving off the meter box in response to the tightening torque.

According to various embodiments of the disclosure, a meter box ground clamp may include a body portion including a first arm portion and a second arm portion, a fastener member configured to couple the body portion to an electrical meter box, and a ground portion configured to couple a ground wire with the meter box. The first arm portion may include an opening configured to receive the fastener member, and the body portion may include a gripping portion configured to extend from the second arm portion and curve toward the first arm portion. The fastener member may be configured to extend through the opening to engage a first surface of the meter box so as to move the first arm portion away from the first surface of the meter box and move the gripping portion into engagement with a second surface of the meter box that faces away from the first surface of the meter box, and the opening may be configured to receive the fastener member at a first angle less than 90 degrees relative to a plane of the first arm portion such that a free end of the fastener member forms a second angle greater than zero degrees relative to the second surface of the meter box. The second angle may be configured to create a force that urges the second arm portion of the body portion toward the meter box in response to a tightening torque applied to the fastener member so as to prevent the body portion from moving off the meter box in response to the tightening torque.

According to various embodiments of the disclosure, a meter box ground clamp may include a body portion having a first portion, a second portion, and a gripping portion that is configured to extend from the second portion and a fastener member configured to couple the body portion to an electrical meter box. The fastening member may be configured to extend through a receiving portion of the first portion to engage a first surface of the meter box so as to move the first portion away from the first surface of the meter box and move the gripping portion into engagement with a second surface of the meter box that faces away from the first surface of the meter box, and the receiving portion may be configured to receive the fastener member at a first angle less than 90 degrees relative to a plane of the first portion such that a free end of the fastener member forms a second angle greater than zero degrees relative to the second surface of the meter box. The second angle may be configured to create a force that urges the second portion of the body portion toward the meter box in response to a tightening torque applied to the fastener member so as to prevent the body portion from moving off the meter box in response to the tightening torque.

The foregoing and other features of construction and operation of the invention will be more readily understood and fully appreciated from the following detailed disclosure, taken in conjunction with accompanying drawings.

DETAILED DESCRIPTION OF EMBODIMENTS

As a preface to the detailed description, it should be noted that, as used in this specification and the appended claims, the singular forms “a”, “an” and “the” include plural referents, unless the context clearly dictates otherwise.

Figure 1:
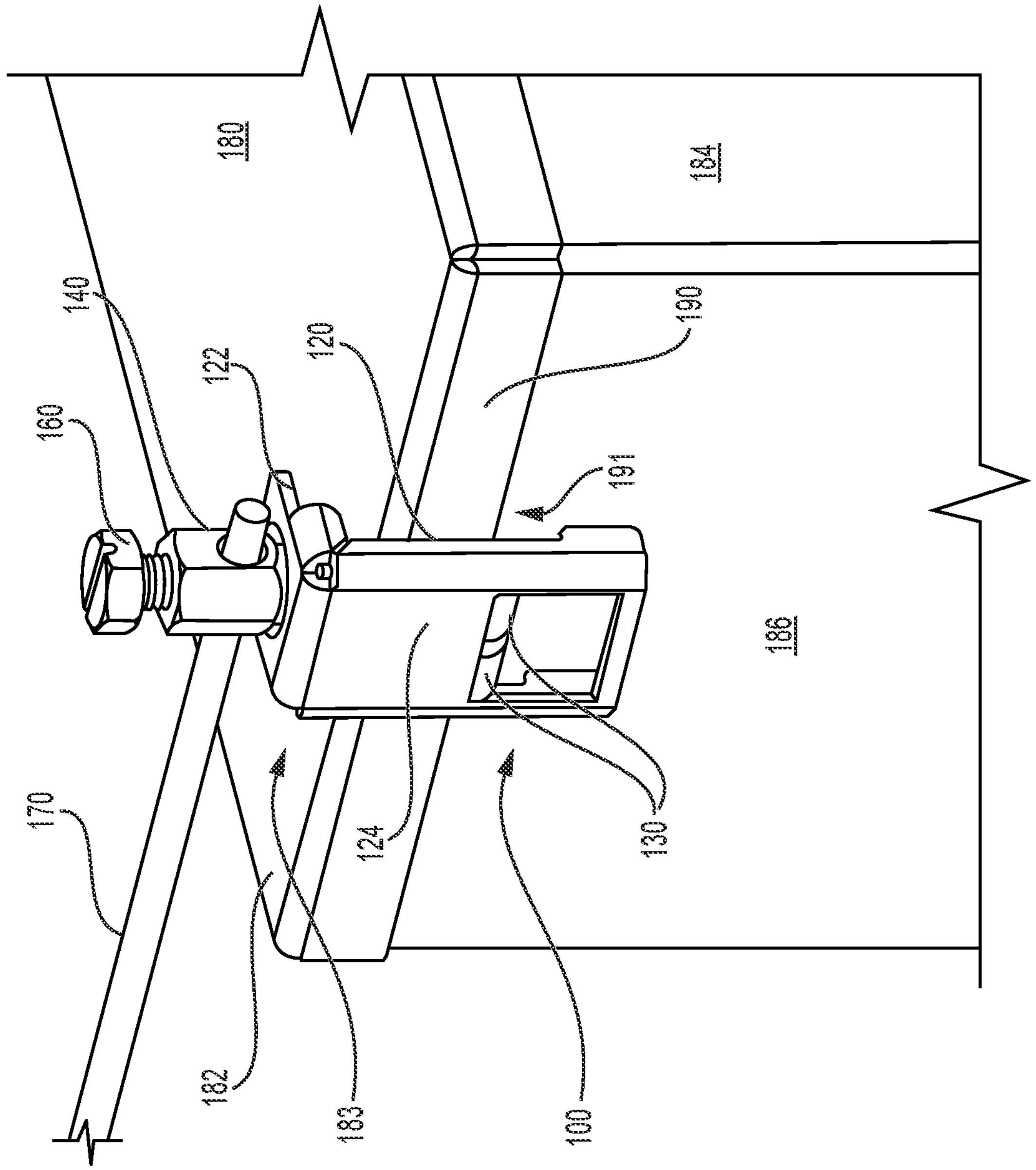
FIG. 1 is a front perspective view of an exemplary ground clamp, in accordance with various aspects of the disclosure, coupled with a meter box.
Figure 2:
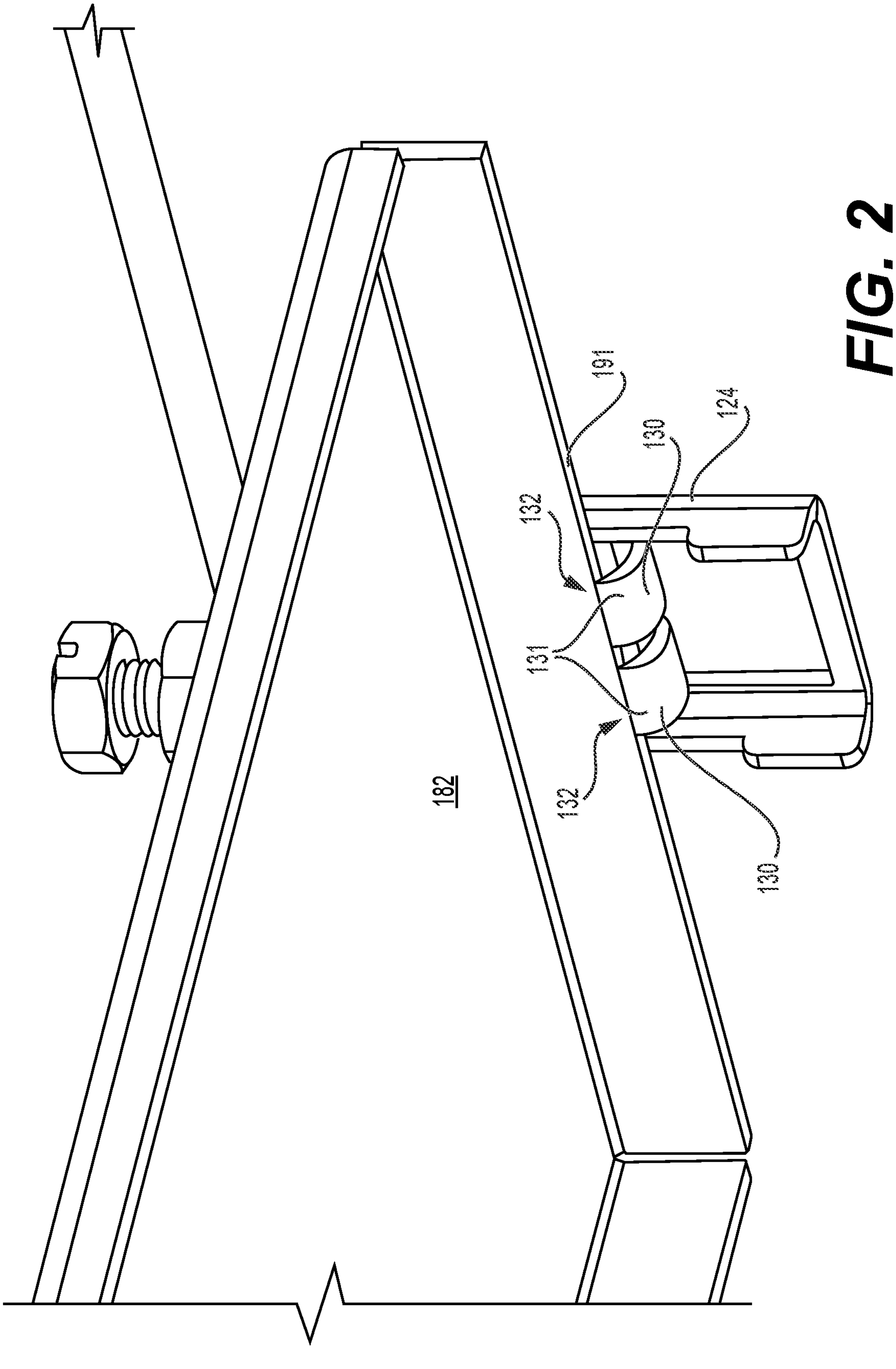
FIG. 2 is bottom perspective view of the exemplary ground clamp and meter box of FIG. 1.
Figure 3:
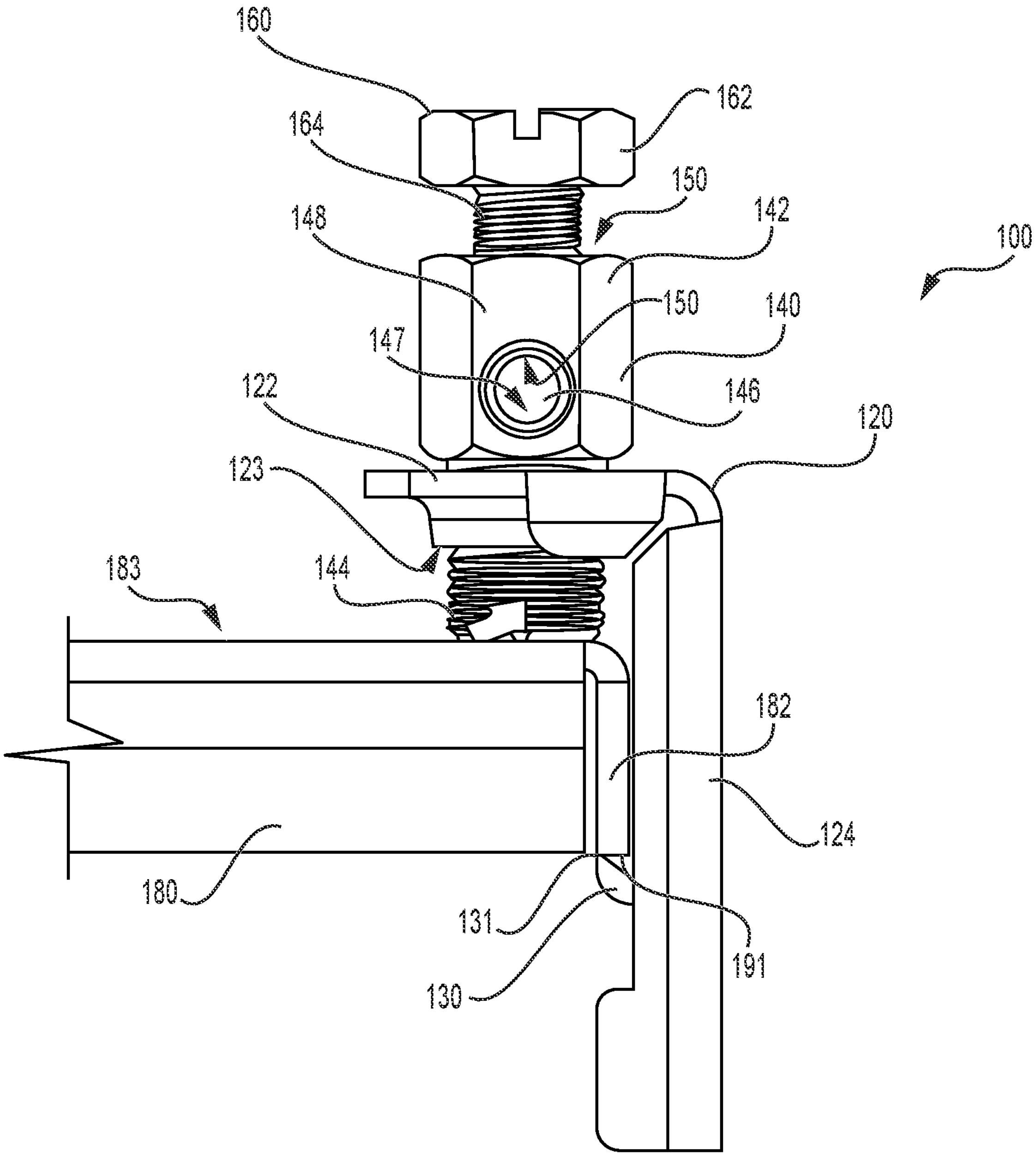
FIG. 3 is an enlarged side view of the exemplary ground clamp of FIG. 1 and a portion of the meter box of FIG. 1.

FIGS. 1-3 illustrate an exemplary meter box ground clamp 100 in accordance with various aspects of the enclosure. The ground clamp 100 includes a clamp body 120, a clamp screw 140, and a ground engagement screw 160 that facilitate connecting a ground wire 170 to an enclosure of an electrical meter box. The ground clamp 100 may be configured to mount the ground wire 170 to a conventional, rectangular electrical meter box 180 having a drip cap 182, a front panel 184, a rear panel (not shown), and side panels 186 (only one shown). The drip cap 182 may include a vertically extending lip portion 190 that overhangs and overlaps the top portions of the panels 184, 186.

As illustrated in FIG. 3, the clamp body 120 is substantially L-shaped with a first arm portion 122 and a second arm portion 124. The first arm portion 122 and the second arm portion 124 may be a monolithic structure of unitary construction, with the arm portions 122, 124 being bent into the L-shaped configuration. The first arm portion 122 includes a threaded opening 123 configured to threadedly receive the clamp screw 140, which is configured to tighten the clamp body 120 to the meter box 180.

The clamp screw 140 includes a head portion 142 and a threaded portion 144 extending from the head portion 142. The head portion 142 may be hexagonal or square to facilitate tightening by a wrench or other torque applying tool. The head portion 142 includes an opening 146 extending through the opposite side walls 148 of the head portion 142. For example, the opening 146 may extend through the head portion 142 via opposite walls of a hexagonal shaped head portion. The opening 146 is sized to receive the ground wire 170 therethrough, shown in FIG. 1.

A top surface 148 of the head portion 142 includes a threaded opening 150 that extends into the opening 146. The ground engagement screw 160 is configured to be threadedly coupled with the opening 150 such that the ground engagement screw 160 can be adjusted to extend into the opening 146 to engage the ground wire 170 extending through the opening 146 and force the ground wire 170 against a wall 147 of the opening to mechanically and electrically couple the ground wire 170 to the clamp body 120. The ground engagement screw 160 includes a head portion 162 and a threaded portion 164 configured to be threadedly coupled with the opening 150. The head portion 162 includes one or more structural features configured to receive a tightening tool, such as a screwdriver, a wrench, or the like.

The clamp body 120 includes a pair of gripping claws 130 that extend from the second arm portion 124. The gripping claws 130 and the second arm portion 124 may be a monolithic structure of unitary construction, with the gripping claws 130 being cut from the second arm portion 124 and formed into a curved shape to define the gripping claws 130, as shown in FIG. 2. For example, three sides of each gripping claw 130 are cut from the second arm portion 124 such that the gripping claws 130 remain connected to the second arm portion 124 in a cantilever manner. The gripping claws 130 are configured to curve from the second arm portion 124 toward the first arm portion 122. Ends 131 of the gripping claws 130 are configured to engage a surface 191 of the lip portion 190 of the drip cap 182.

In use, the first arm portion 122 is positioned adjacent a top surface 183 of the drip cap 182, and the clamp screw 140 is withdrawn from the threaded opening 150 by an amount sufficient to permit the gripping claws 130 to be positioned at an opposite side of the surface 191 of the lip portion 190 relative to the first arm portion 122. The clamp screw 140 is threaded into the opening 150 to engage the top surface 183 of the drip cap 182. Further threading of the clamp screw 140 into the opening 150 moves the first arm portion 122 away from the top surface 183 of the drip cap 182 and moves the gripping claws 130 toward and into engagement with the surface 191 of the lip portion 190. The clamp screw 140 can be threaded into the opening 150 until the clamp body 120 is secured to the drip cap 182 with a desired gripping force. The grounding wire 170 is inserted through the head portion 142 of the clamp screw 140 via the opening 146, and the ground engagement screw 160 is threaded into the opening 150 to mechanically and electrically couple the ground wire 170 to the clamp body 120. The separate gripping claws 130 have multiple contact regions 132 configured to the engage the surface 191 of the lip portion 190. In some aspects, the contact regions 132 may be angled (i.e., not parallel) relative to one another such that the gripping claws 130 are configured to engage the surface 191 of the lip portion 190 even if the surface 190 is nonlinear. Consequently, the gripping claws 130 are configured to adapt to an inconsistent (e.g., non-linear) surface of the lip portion 190 to maintain a secure connection between the ground clamp 100 and the meter box 180.

Figure 4:
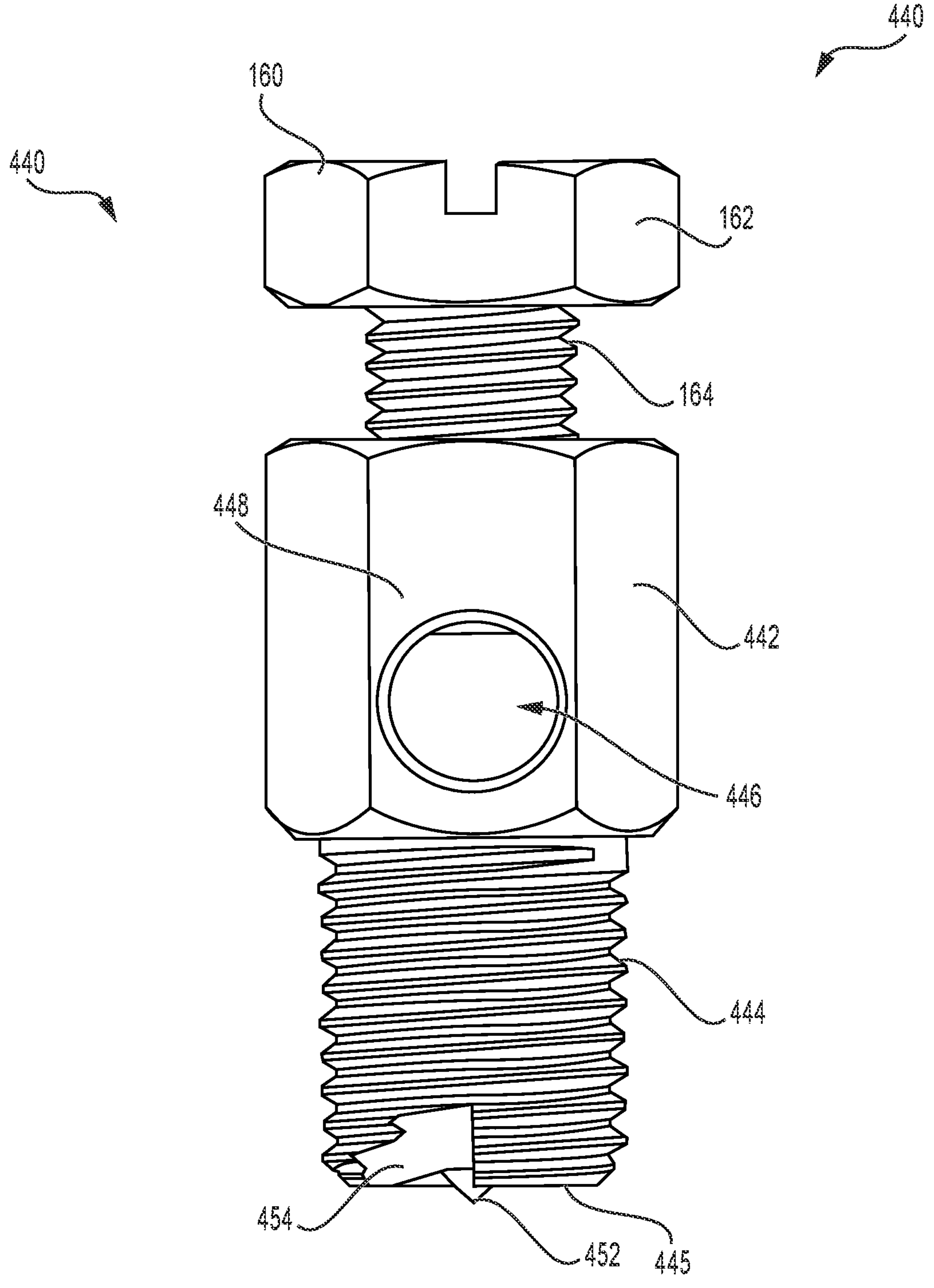
FIG. 4 is side view of an exemplary clamp screw of the exemplary ground clamp FIG. 1.
Figure 5:
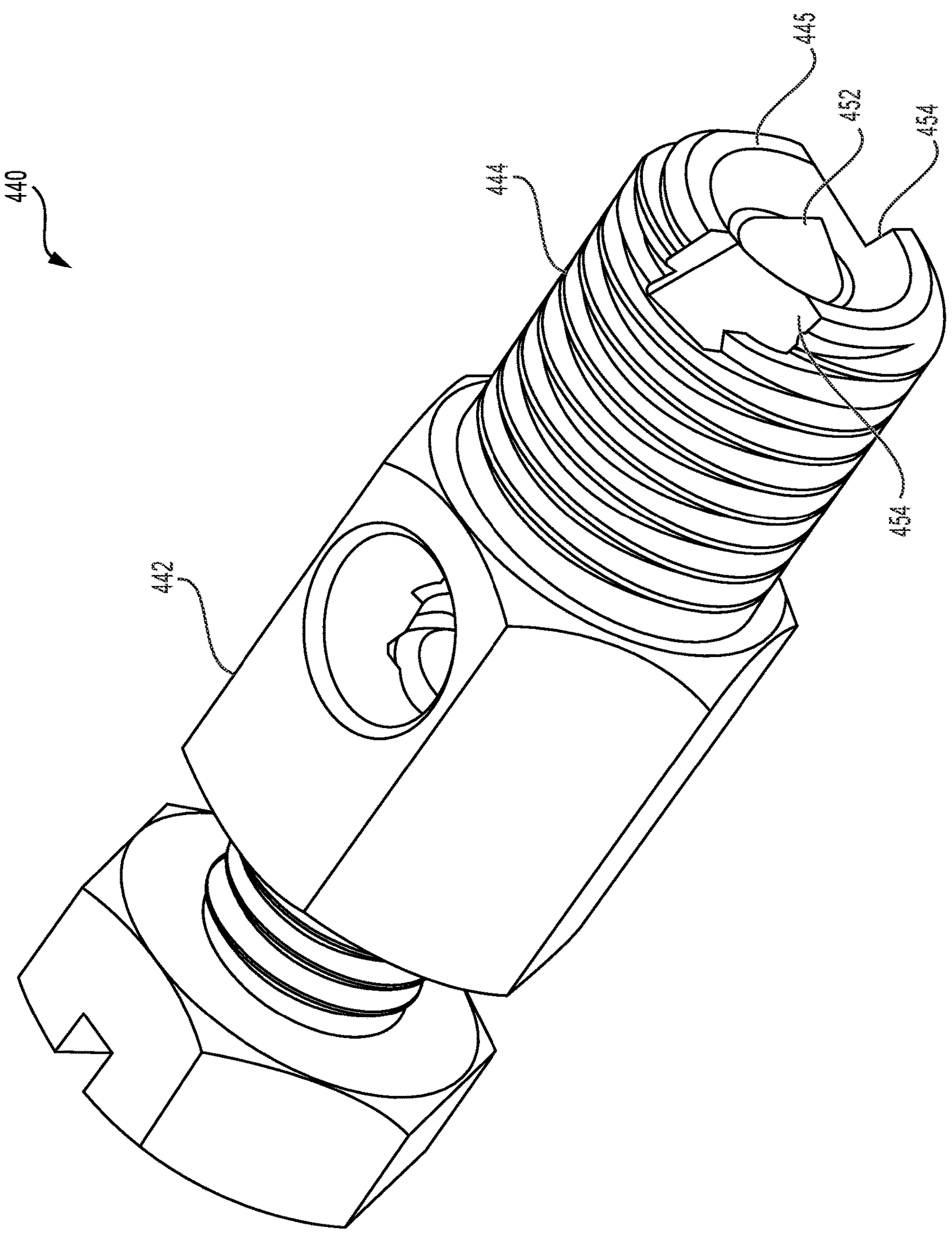
FIG. 5 is a perspective view of the exemplary clamp screw of FIG. 4.
Figure 6:
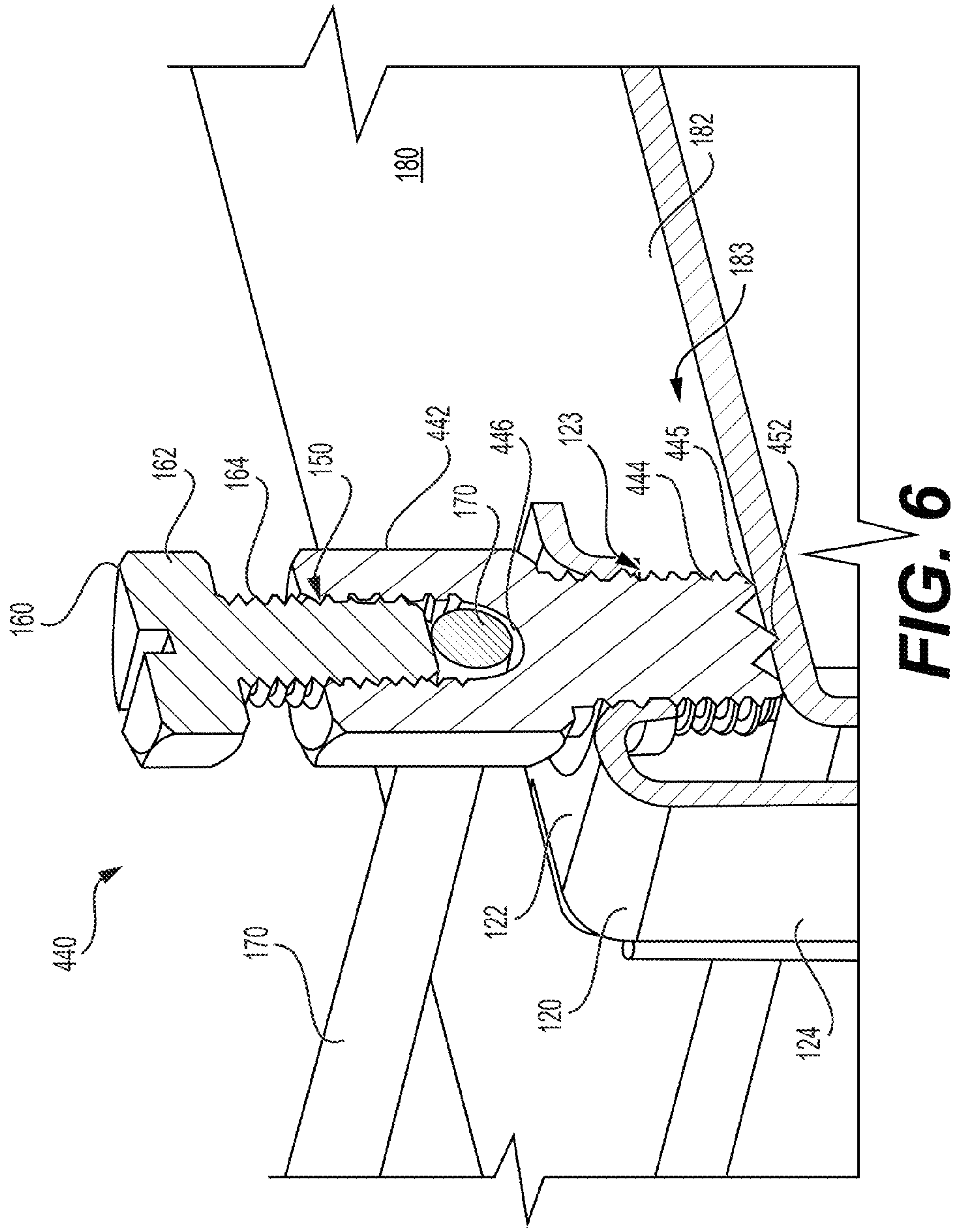
FIG. 6 is a perspective cross-sectional view of the exemplary ground clamp of FIG. 1 and a portion of the meter box of FIG. 1.

In some embodiments of the ground clamp 100, the clamp screw 140 may be configured as the clamp screw 440 shown in FIGS. 4-6. As shown in FIGS. 4-6, clamp screw 440 is configured similar to a self-tapping sheet metal screw. For example, the clamp screw 440 includes a head portion 442 and a threaded portion 444 extending from the head portion 442 to a free end 445. The head portion 442 may be hexagonal or square to facilitate tightening by a wrench or other torque applying tool. The head portion 442 includes an opening 446 extending through the opposite side walls 448 of the head portion 442. For example, the opening 446 may extend through the head portion 442 via opposite walls 448 of a hexagonal shaped head portion. The opening 446 is sized to receive the ground wire 170 therethrough, as described above.

As illustrated in FIGS. 4-6, the clamp screw 440 includes a tip portion 452 that extends from a radial center of the threaded portion 444 at the free end 445. As best shown in FIGS. 4 and 6, the tip portion 452 extends beyond the free end 445 of the threaded portion 444. The clamp screw 440 may also include flutes 454 cut into the threaded portion 444 at the free end 445. The flutes 454 may be configured as wedges cut into the threaded portion 444 at about a 45 degree angle.

The tip portion 452 is configured to engage the top surface 183 of the drip cap 182 before the threaded portion when the clamp body 120 is being clamped to the drip cap 182. As such, the tip portion 452 is configured to center the clamp screw 440 at a desired location at the top surface 183 of the drip cap 182 as torque is applied to the head portion 442 and to prevent the ground clamp 100 from walking (i.e., moving) relative to the drip cap 182 while the clamp body is being tightened to the drip cap 182. The flutes 445 are configured to cut into the top surface 183 of the drip cap 182 to strip any paint or other substance off the drip cap 182. For example, the wedge-shaped flutes create a sharp/blunt edge configured to scrape paint or other substance off the top surface 183 to expose the base metal of the drip cap 182 to facilitate better a better grounding connection between the ground clamp 100 and the meter box 180.

Figure 7:
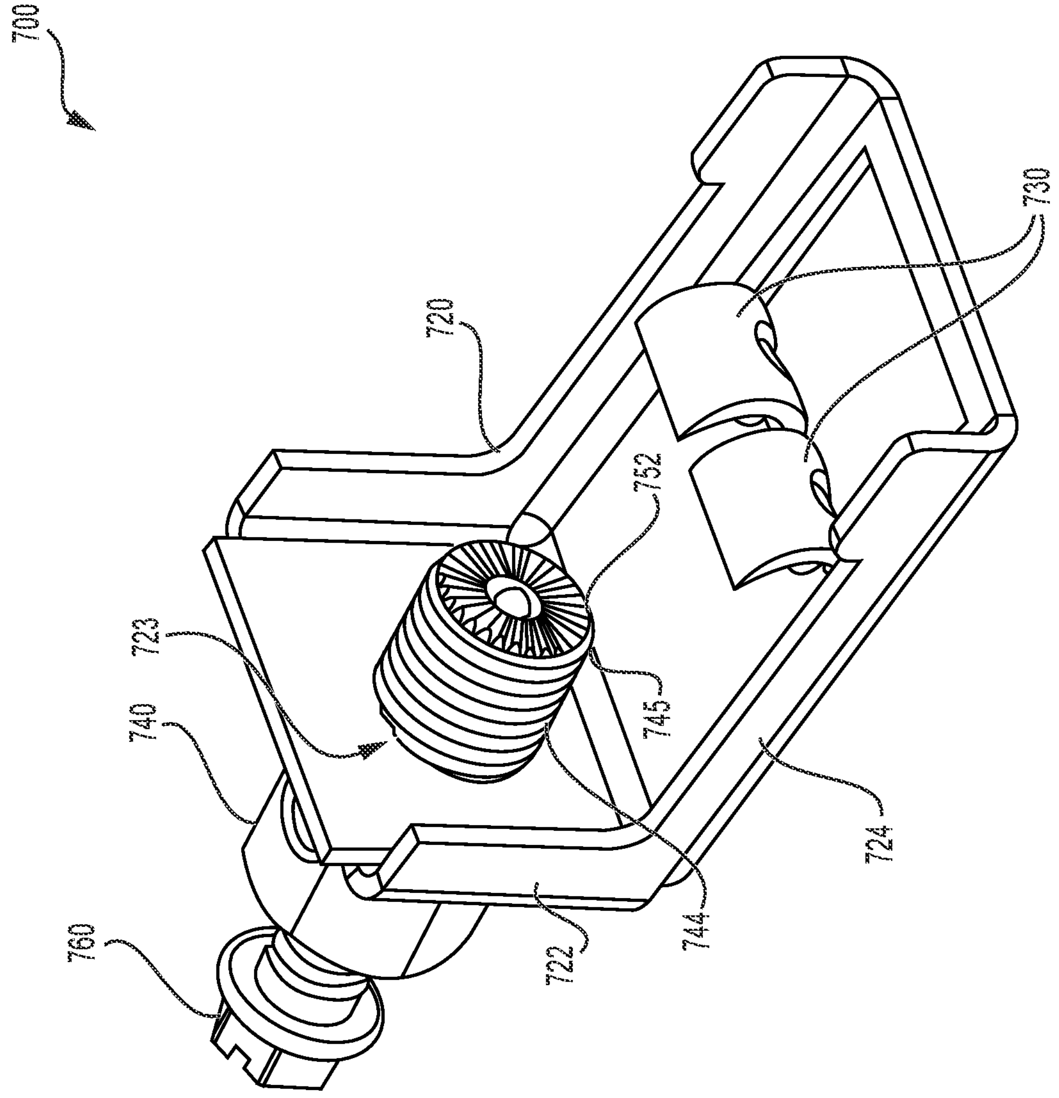
FIG. 7 is a perspective view of another exemplary ground clamp, in accordance with various aspects of the disclosure.
Figure 8:
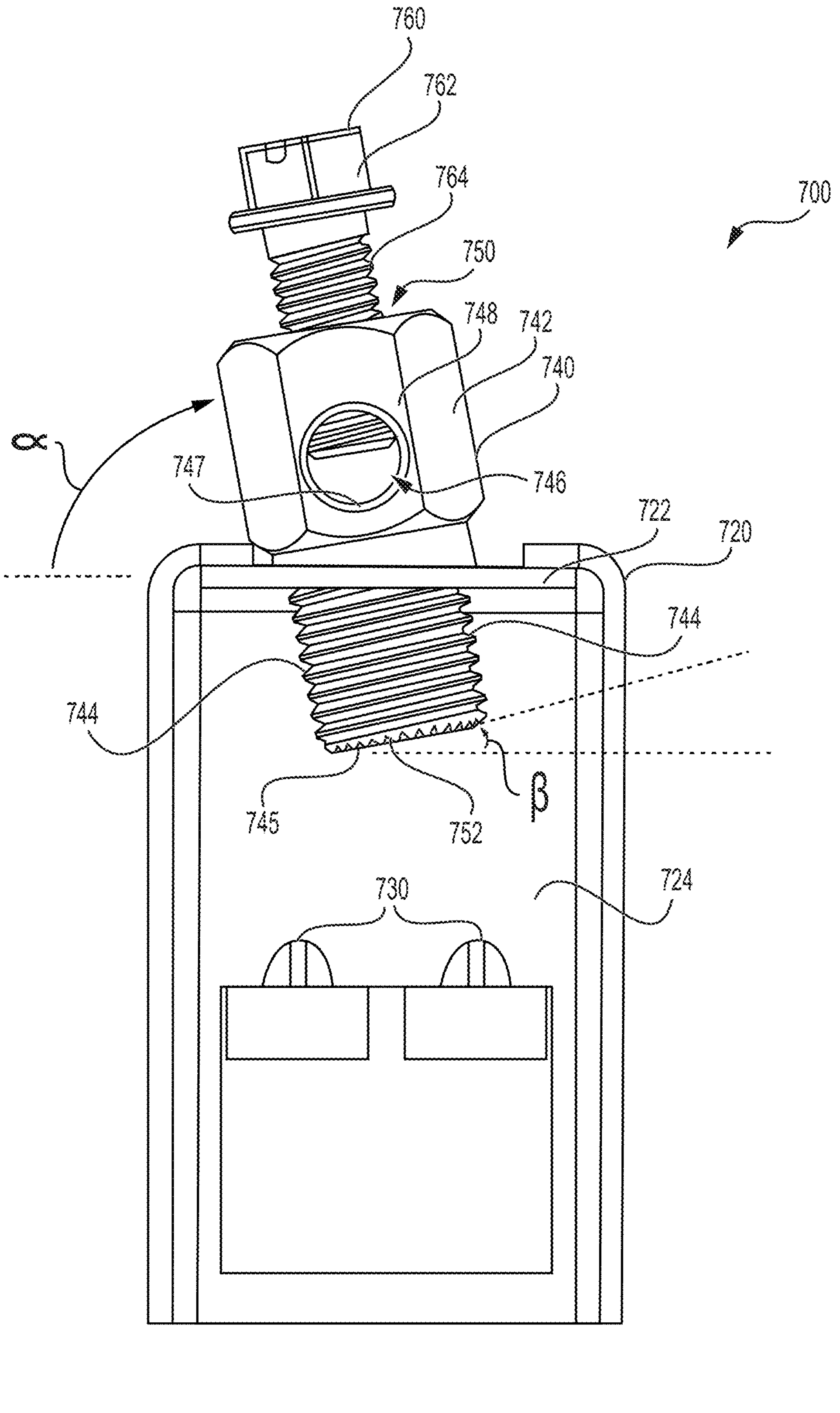
FIG. 8 is a front view of the exemplary ground clamp of FIG. 7.
Figure 9:
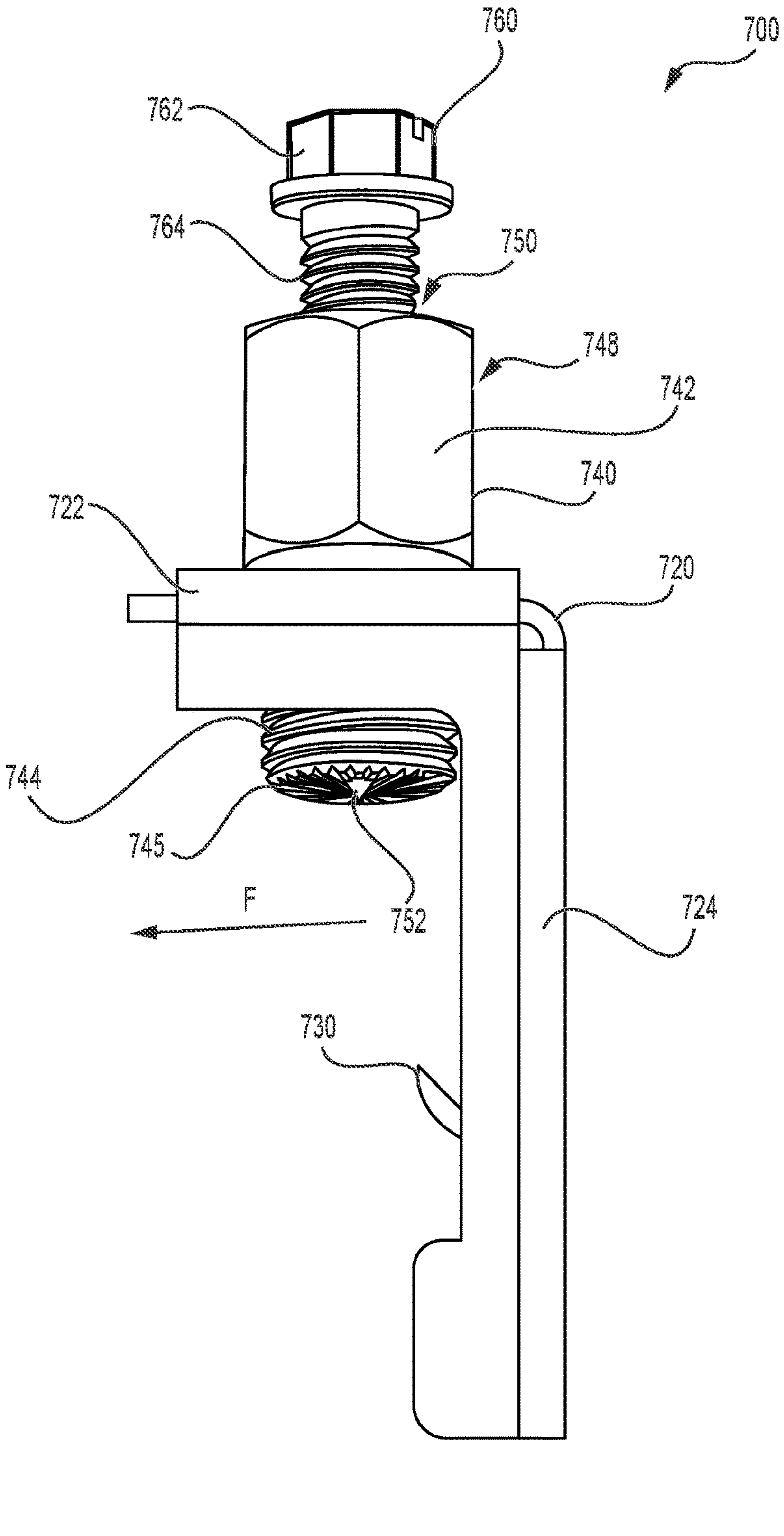
FIG. 9 is a side view of the exemplary ground clamp of FIG. 7.
Figure 10:
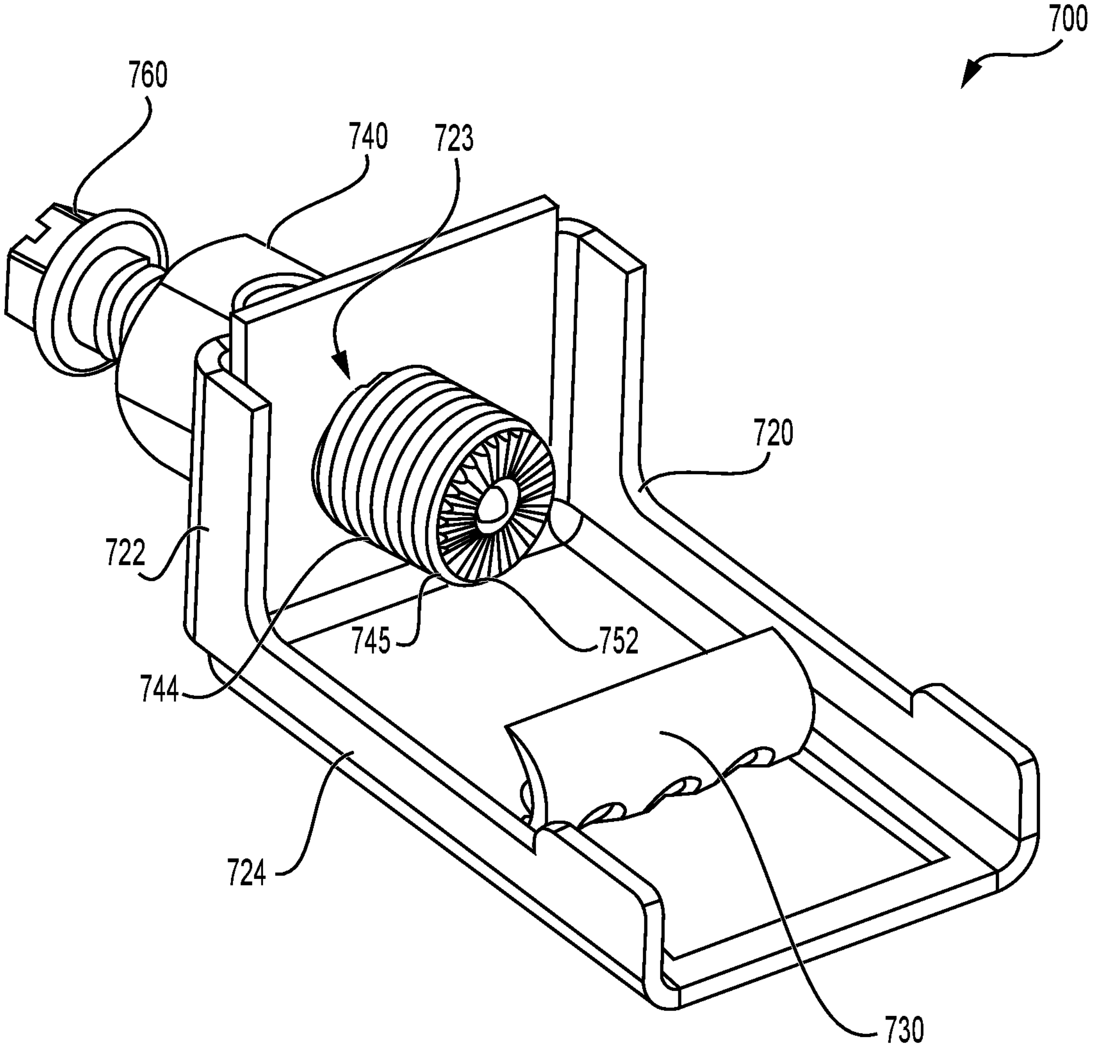
FIG. 10 is a perspective view of another exemplary ground clamp, in accordance with various aspects of the disclosure.

Referring now to FIGS. 7-9, another embodiment of an exemplary ground clamp 700 is illustrated. The ground clamp 700 is similar to the ground clamp 100 in that the ground clamp includes a clamp body 720, a clamp screw 740, and a ground engagement screw 760 which facilitate connecting a ground wire 170 to an enclosure of an electrical meter box. The ground clamp 700 may be configured to mount the ground wire 170 to the conventional, rectangular electrical meter box described above.

As illustrated in FIGS. 7 and 9, the clamp body 720 is substantially L-shaped with a first arm portion 722 and a second arm portion 724. The first arm portion 722 and the second arm portion 724 may be a monolithic structure of unitary construction, with the arm portions 722, 724 being bent into the L-shaped configuration. The first arm portion 722 includes a threaded opening 723 configured to threadedly receive the clamp screw 740, which is configured to tighten the clamp body 720 to the meter box 180.

The clamp screw 740 includes a head portion 742 and a threaded portion 744 extending from the head portion 742. The head portion 742 may be hexagonal or square to facilitate tightening by a wrench or other torque applying tool. The head portion 742 includes an opening 746 extending through the opposite side walls 748 of the head portion 742. For example, the opening 746 may extend through the head portion 742 via opposite walls of a hexagonal shaped head portion. The opening 746 is sized to receive the ground wire 170 therethrough, as discussed above.

A top surface 748 of the head portion 742 includes a threaded opening 750 that extends into the opening 746. The ground engagement screw 760 is configured to be threadedly coupled with the opening 750 such that the ground engagement screw 760 can be adjusted to extend into the opening 746 to engage the ground wire 170 extending through the opening 746 and force the ground wire 170 against a wall 747 of the opening to mechanically and electrically couple the ground wire 170 to the clamp body 720. The ground engagement screw 760 includes a head portion 762 and a threaded portion 764 configured to be threadedly coupled with the opening 750. The head portion 762 includes one or more structural features configured to receive a tightening tool, such as a screwdriver, a wrench, or the like.

The clamp body 720 includes a pair of gripping claws 730 that extend from the second arm portion 724. The gripping claws 730 and the second arm portion 724 may be a monolithic structure of unitary construction, with the gripping claws 730 being cut from the second arm portion 724 and formed into a curved shape to define the gripping claws 730, as shown in FIG. 7. For example, three sides of each gripping claw 730 are cut from the second arm portion 724 such that the gripping claws 730 remain connected to the second arm portion 724 in a cantilever manner. The gripping claws 730 are configured to curve from the second arm portion 724 toward the first arm portion 722. Ends 731 of the gripping claws 730 are configured to engage a surface 191 of the lip portion 190 of the drip cap 182.

As best illustrated in FIG. 8, the threads of the threaded opening 723 are configured to receive the clamp screw 740 at an angle α relative to a plane of the first arm portion 722. In various aspects, the angle α may range from 45 degrees to 85 degrees. Consequently, the free end 745 of the clamp screw 740 forms an angle β relative to the plane. In various aspects, the angle β may range from 5 degrees to 45 degrees. As a result of the angle β between the free end 745 of the clamp screw 740 and the plane, when the clamp screw 740 is threaded into the threaded opening 750 to tighten the clamp body 720 to the drip cap 182, the tightening torque creates a force that urges the clamp body 720 in the direction F in FIG. 9 (out of the paper in FIG. 8), which is toward the meter box 180. Thus, if the clamp body 720 tends to walk or travel relative to the meter box 180, the tightening torque will urge the clamp body 720 toward the meter box 180 rather than off the meter box 180.

However, depending on the angle β, if the clamp screw 740 is configured similar to the clamp screw 440 described above, the tip portion 752 may or may not be configured to engage the top surface 183 of the drip cap 182 before the threaded portion 744 when the clamp body 120 is being clamped to the drip cap 182. For example, if the angle β is greater than a predetermined angle, the tip portion 752 will not be configured to engage the top surface 183 of the drip cap 182 before the threaded portion 744 when the clamp body 120 is being clamped to the drip cap 182. But if the angle β is less than or equal to the predetermined angle, the tip portion 752 will be configured to engage the top surface 183 of the drip cap 182 before the threaded portion 744 when the clamp body 120 is being clamped to the drip cap 182.

In use, the first arm portion 722 is positioned adjacent the top surface 183 of the drip cap 182, and the clamp screw 740 is withdrawn from the threaded opening 750 by an amount sufficient to permit the gripping claws 730 to be positioned at an opposite side of the surface 191 of the lip portion 190 relative to the first arm portion 722. The clamp screw 740 is threaded into the opening 750 at the angle β to engage the top surface 183 of the drip cap 182. Further threading of the clamp screw 740 into the opening 750 moves the first arm portion 722 away from the top surface 183 of the drip cap 182 and moves the gripping claws 730 toward and into engagement with the surface 191 of the lip portion 190. The clamp screw 740 can be threaded into the opening 750 until the clamp body 720 is secured to the drip cap 182 with a desired gripping force. As discussed above, the tightening torque may create a force that urges the clamp body 720 in the direction F in FIG. 9 (out of the paper in FIG. 8), which is toward the meter box 180. Thus, if the clamp body 720 tends to walk or travel relative to the meter box 180, the tightening torque will urge the clamp body 720 toward the meter box 180 and prevent the clamp body 720 from walking off the meter box 180.

The grounding wire 170 is inserted through the head portion 742 of the clamp screw 740 via the opening 746, and the ground engagement screw 760 is threaded into the opening 750 to mechanically and electrically couple the ground wire 170 to the clamp body 720. The separate gripping claws 730 have multiple contact regions 732 configured to the engage the surface 191 of the lip portion 190. In some aspects, the contact regions 732 may be angled (i.e., not parallel) relative to one another such that the gripping claws 730 are configured to engage the surface 191 of the lip portion 190 even if the surface 191 is nonlinear. Consequently, the gripping claws 730 are configured to adapt to an inconsistent (e.g., non-linear) surface of the lip portion 190 to maintain a secure connection between the ground clamp 700 and the meter box 180.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A meter box ground clamp configured to prevent the clamp from moving off the meter box in response to a tightening torque, comprising:

a clamp body;

a clamp screw configured to couple the clamp body to an electrical meter box;

a ground engagement screw configured to couple a ground wire with the electrical meter box;

wherein the clamp body comprises an L-shaped body that includes a first arm portion and a second arm portion that are configured as a monolithic structure of unitary construction;

wherein the clamp screw includes a head portion and a threaded portion extending from the head portion;

wherein the first arm portion includes a first threaded opening configured to threadedly receive the threaded portion of the clamp screw;

wherein the head portion of the clamp screw includes an opening configured to extend through the head portion and to receive the ground wire therethrough;

wherein a top surface of the head portion includes a second threaded opening configured to extend into the opening and to threadedly receive the ground engagement screw;

wherein the ground engagement screw is configured to be threaded into the opening to engage the ground wire and mechanically and electrically couple the ground wire to the clamp body;

wherein the clamp body includes a gripping claw configured to extend from the second arm portion and curve toward the first arm portion;

wherein the gripping claw is configured to engage a first surface of an electrical meter box, and the first arm portion is configured to be positioned adjacent a second surface of the meter box;

wherein the clamp screw is configured to be threaded into the first threaded opening to engage the second surface of the meter box that faces away from the first surface of the meter box so as to move the first arm portion away from the second surface of the meter box and move the gripping claw into engagement with the first surface of the meter box;

wherein the clamp screw includes a tip portion that extends from a radial center of the threaded portion at the free end and is configured to extend beyond the free end of the threaded portion such that the tip portion is configured to engage the second surface of the meter box before the threaded portion when the clamp body is being clamped to the meter box;

wherein the tip portion is configured to center the clamp screw at a desired location at the second surface of the meter box when the clamp screw is tightening the clamp body to the meter box;

wherein the threaded portion of the clamp screw includes a fluted portion at the free end that is configured to cut into the second surface of the meter box to strip paint from the second surface when the clamp screw is tightening the clamp body to the meter box so as to expose base metal of the meter box to facilitate a better grounding connection between the ground clamp and the meter box;

wherein the first threaded opening is configured to receive the clamp screw at a first angle less than 90 degrees relative to a plane of the first arm portion such that a free end of the clamp screw forms a second angle greater than zero degrees relative to the second surface of the meter box; and wherein the second angle is configured to create a force that urges the second arm of the clamp body toward the meter box in response to a tightening torque applied to the clamp screw so as to prevent the clamp body from moving off the meter box in response to the tightening torque.

2. The clamp of claim 1, wherein the gripping claw comprises two gripping claws spaced apart from one another.

3. The clamp of claim 1, wherein each of the gripping claws has a contact region configured to engage the first surface of the meter box to maintain a secure connection between the ground clamp and the meter box.

4. A meter box ground clamp configured to prevent the clamp from moving off the meter box in response to a tightening torque, comprising:

a body portion including a first arm portion and a second arm portion;

a fastener member configured to couple the body portion to an electrical meter box;

a ground portion configured to couple a ground wire with the meter box;

wherein the first arm portion includes an opening configured to receive the fastener member;

wherein the body portion includes a gripping portion configured to extend from the second arm portion and curve toward the first arm portion;

wherein the fastener member is configured to extend through the opening to engage a first surface of the meter box so as to move the first arm portion away from the first surface of the meter box and move the gripping portion into engagement with a second surface of the meter box that faces away from the first surface of the meter box;

wherein the opening is configured to receive the fastener member at a first angle less than 90 degrees relative to a plane of the first arm portion such that a free end of the fastener member forms a second angle greater than zero degrees relative to the second surface of the meter box; and wherein the second angle is configured to create a force that urges the second arm portion of the body portion toward the meter box in response to a tightening torque applied to the fastener member so as to prevent the body portion from moving off the meter box in response to the tightening torque.

5. The clamp of claim 4, wherein the grounding portion comprises a ground engagement screw configured to couple a ground wire with the electrical meter box.

6. The clamp of claim 5, wherein the fastener member comprises a clamp screw that includes a head portion and a threaded portion extending from the head portion.

7. The clamp of claim 6, wherein the head portion of the clamp screw includes an opening configured to extend through the head portion and to receive a ground wire therethrough, a top surface of the head portion includes a threaded opening configured to extend into the opening and to threadedly receive the ground engagement screw, and the ground engagement screw is configured to be threaded into the opening in the head portion to engage the ground wire and mechanically and electrically couple the ground wire to the body portion.

8. The clamp of claim 4, wherein the opening in the first arm portion comprises a threaded opening that is configured to threadedly receive a threaded portion of the fastener member.

9. The clamp of claim 4, wherein the body portion comprises an L-shaped body that includes the first arm portion and the second arm portion configured as a monolithic structure of unitary construction.

10. The clamp of claim 4, wherein the fastener member comprises a screw that includes a threaded portion and a tip portion configured to extend from a radial center of the threaded portion at a free end of the fastener member, and the tip portion is configured to extend beyond the free end of the threaded portion such that the tip portion is configured to engage the second surface of the meter box before the threaded portion when the body portion is being clamped to the meter box so as to center the screw at a desired location at the second surface of the meter box when the screw is tightening the body portion to the meter box.

11. The clamp of claim 4, wherein the fastener member comprises a screw that includes a threaded portion and a fluted portion at a free end of the threaded portion, and the fluted portion is configured to cut into the second surface of the meter box to strip paint from the second surface when the clamp screw is tightening the body portion to the meter box so as to expose a base metal of the meter box to facilitate an improved grounding connection between the ground clamp and the meter box.

12. A meter box ground clamp configured to prevent the clamp from moving off the meter box in response to a tightening torque, comprising:

a body portion including a first portion, a second portion, and a gripping portion that is configured to extend from the second portion;

a fastener member configured to couple the body portion to an electrical meter box;

wherein the fastener member is configured to extend through a receiving portion of the first portion to engage a first surface of the meter box so as to move the first portion away from the first surface of the meter box and move the gripping portion into engagement with a second surface of the meter box that faces away from the first surface of the meter box;

wherein the receiving portion is configured to receive the fastener member at a first angle less than 90 degrees relative to a plane of the first portion such that a free end of the fastener member forms a second angle greater than zero degrees relative to the second surface of the meter box; and wherein the second angle is configured to create a force that urges the second portion of the body portion toward the meter box in response to a tightening torque applied to the fastener member so as to prevent the body portion from moving off the meter box in response to the tightening torque.

13. The clamp of claim 12, further comprising a ground portion that is configured to couple a ground wire with the meter box.

14. The clamp of claim 13, wherein the grounding portion includes a ground engagement screw configured to couple a ground wire with the electrical meter box.

15. The clamp of claim 14, wherein the fastener member comprises a clamp screw that includes a head portion and a threaded portion extending from the head portion.

16. The clamp of claim 15, wherein the head portion of the clamp screw includes a receiving portion configured to extend through the head portion and to receive a ground wire therethrough, a top surface of the head portion includes an opening configured to extend into the receiving portion and to threadedly receive the ground engagement screw, and the ground engagement screw is configured to be threadedly received by the opening in the head portion to engage the ground wire and mechanically and electrically couple the ground wire to the body portion.

17. The clamp of claim 12, wherein the opening in the first arm portion comprises a threaded opening configured to threadedly receive a threaded portion of the fastener member.

18. The clamp of claim 12, wherein the body portion comprises an L-shaped body that includes the first portion and the second portion configured as a monolithic structure of unitary construction.

19. The clamp of claim 12, wherein the fastener member comprises a screw that includes a threaded portion and a tip portion configured to extend from a radial center of the threaded portion at a free end of the fastener member, and the tip portion is configured to extend beyond the free end of the threaded portion such that the tip portion is configured to engage the second surface of the meter box before the threaded portion when the body portion is being clamped to the meter box so as to center the screw at a desired location at the second surface of the meter box when the screw is tightening the body portion to the meter box.

20. The clamp of claim 12, wherein the fastener member comprises a screw that includes a threaded portion and a fluted portion at a free end of the threaded portion, and the fluted portion is configured to cut into the second surface of the meter box to strip paint from the second surface when the clamp screw is tightening the body portion to the meter box so as to expose a base metal of the meter box to facilitate an improved grounding connection between the ground clamp and the meter box.

* * * * *